(12) United States Patent
Vige et al.

(10) Patent No.: US 6,371,537 B1
(45) Date of Patent: Apr. 16, 2002

(54) ELECTRIC LOCK CASING FOR AN AUTOMOBILE VEHICLE BOOT CLOSURE MEMBER

(75) Inventors: Sylvie Vige, Jouars Ponchartrain; Minh Au Truong, Chatenay-Malabry, both of (FR)

(73) Assignee: Aries Industries Mecanismes et Decoupage Fin, Les Ulis (FR)

( * ) Notice: Subject to any disclaimer, the term of this patent is extended or adjusted under 35 U.S.C. 154(b) by 54 days.

(21) Appl. No.: 09/633,812

(22) Filed: Aug. 7, 2000

(30) Foreign Application Priority Data

Aug. 6, 1999 (FR) .............................................. 99 10284

(51) Int. Cl.[7] ................................................. E05C 3/06
(52) U.S. Cl. ................................. 292/201; 292/DIG. 23
(58) Field of Search ............................... 292/216, 201, 292/DIG. 23, DIG. 53, 337

(56) References Cited

U.S. PATENT DOCUMENTS 4,575,138 A * 3/1986 Nakamura .................. 292/216
4,735,447 A   4/1988 Kleefeldt
4,969,672 A * 11/1990 Childs ......................... 292/201
5,713,613 A *  2/1998 Honma ........................ 292/201

FOREIGN PATENT DOCUMENTS

| DE | 19702205 A1 | 7/1998 |
| GB | 2204351 A | 11/1988 |

* cited by examiner

Primary Examiner—Gary Estremsky
(74) Attorney, Agent, or Firm—Young & Thompson

(57) ABSTRACT

The invention provides an electrical lock casing for a closure member of an automobile vehicle boot, said lock comprising a mechanical module (10), an electrical module (30) and a kinematic system (34, 35, 36). The casing comprises a first member (41) receiving the mechanical module (10), a second member (50) for supporting the electrical module and the kinematic system joined to the upper part of the first member (41) by a hinge (55) by means of which the second member (50) pivots on the first member, and a cover (60) connected to the second member by a hinge (56) whereby said cover (60) pivots over the face of the second member (50) opposite that in contact with the first member (41).

6 Claims, 6 Drawing Sheets

ELECTRIC LOCK CASING FOR AN AUTOMOBILE VEHICLE BOOT CLOSURE MEMBER

Figure 1:
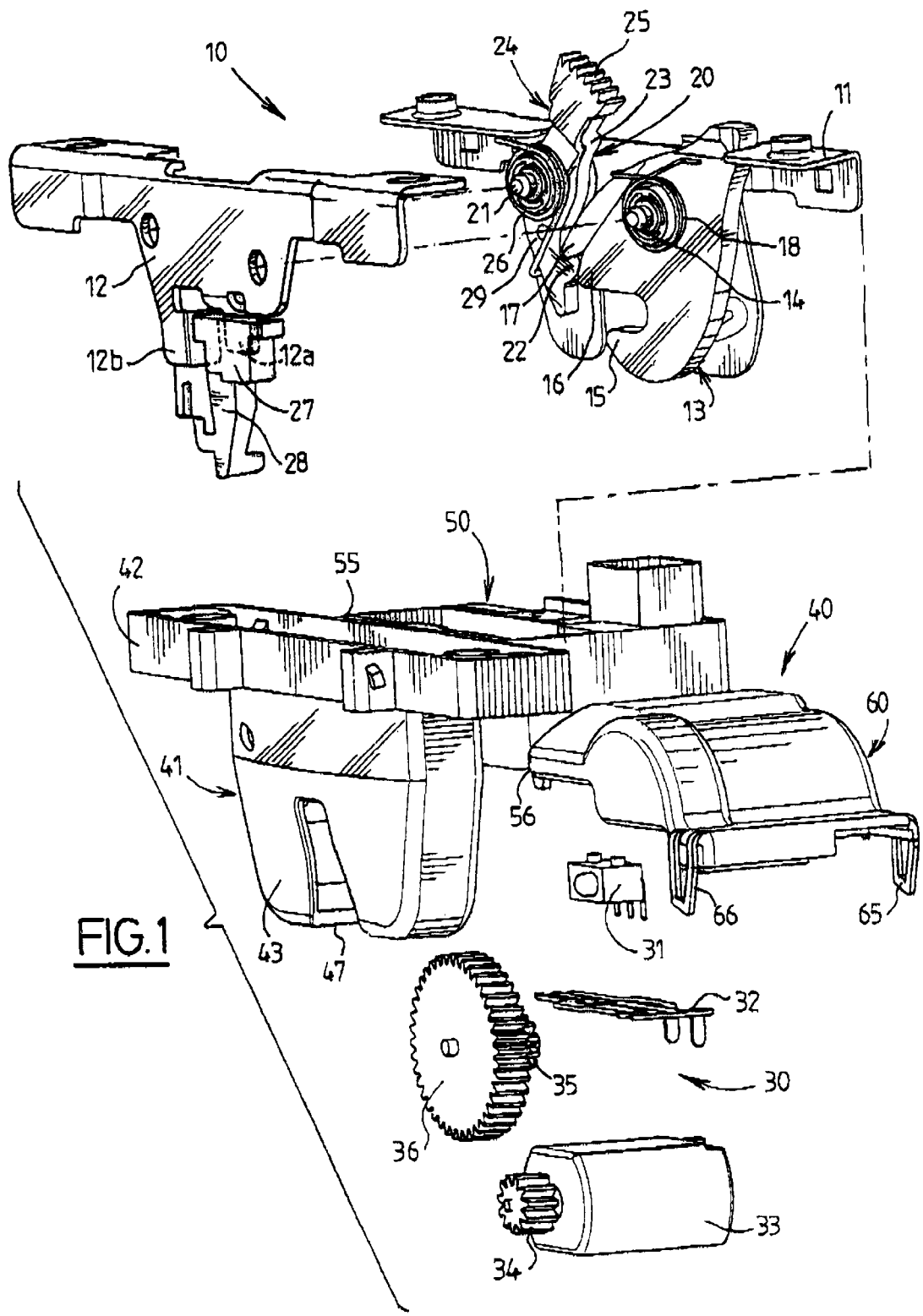

The present invention relates to an electric lock casing for automobile vehicle boot closure members, for example boot lids or hatchbacks.

Automobile vehicle boot closure members are equipped with a lock which generally includes at least one plate mounted on the boot closure member and which supports the various mechanical components of the lock.

Those mechanical components generally comprise a bolt mounted on the plate and pivoting on a pivot pin between an open position disengaged from a striker and a position tripped by said striker and a ratchet mechanism mounted on said plate and pivoting about a pivot pin between a position locking the bolt in the closed position and a position releasing said bolt.

The bolt is associated with a return spring member which biases it to an open position, i.e. a position disengaged from the striker, and the ratchet mechanism is associated with a return spring member which biases it in the direction of the bolt.

The above mechanical components are associated with an electrical module which includes an electric motor whose output shaft co-operates with a kinematic system operating on an actuator member of the ratchet mechanism.

The various mechanical components and the electrical module are housed in a casing fixed to the plate which is itself mounted on the boot closure member.

Until now, lock casings have included at least two independent parts, for example a base supporting the various components of the lock and a cover fixed to the base by screw members.

The base has, at the bottom, a throat adapted to receive the striker mounted on the structure of the boot when the boot closure member is closed.

The above type of casing, generally made from plastics materials, require several injection moulding operations during its fabrication and several assembly operations during its fitting to the vehicle, not to mention the use of screw members for fixing the cover to the base, all of which significantly increases the cost of the locks provided with such casings.

An object of the invention is to avoid the above drawbacks.

The invention therefore provides an electrical lock casing for a closure member of an automobile vehicle boot, said lock comprising a mechanical module including, on at least one bracket, a bolt pivoting between a position disengaged from a striker and a position engaged over said striker, a ratchet mechanism pivoting between a position immobilising the bolt in the tripped position and a position releasing said bolt, an actuator member for actuating the ratchet mechanism, and an electrical module including a sensor for sensing the position of the bolt and a connection and power supply circuit for the sensor and an electric motor whose output shaft co-operates with a kinematic system for actuating the actuator member of the ratchet mechanism, characterized in that the casing comprises:

a first member receiving the mechanical module and including an upper part for supporting said bracket and an inverted U-shaped lower part forming a housing for the bolt and the ratchet mechanism and having at its base a throat through which the striker passes, a second member for supporting the electrical module and the kinematic system joined to the upper part of the first member by a hinge by means of which the second member pivots on the first member to connect the kinematic system to the actuator member of the ratchet mechanism, and a cover connected to the second member by a hinge whereby said cover pivots over the face of the second member opposite that in contact with the first member to support the electrical module and the kinematic system.

According to other features of the invention:

the first member, the second member and the cover form a one-piece plastics material component, the hinge between the first member and the second member is parallel to the plane of pivoting of the bolt.

the hinge between the second member and the cover is perpendicular to the plane of pivoting of the bolt, the second member includes bearing surfaces for supporting the electrical module and the kinematic system, the cover includes complementary bearing surfaces for supporting said electrical module and said kinematic system, and said bearing surfaces are moulded in one piece with said casing, the second member has at least one lug for attaching it to the first member, the cover has at least one lug for attaching it to the second member and said lugs are moulded in one piece with said casing.

Figure 2:
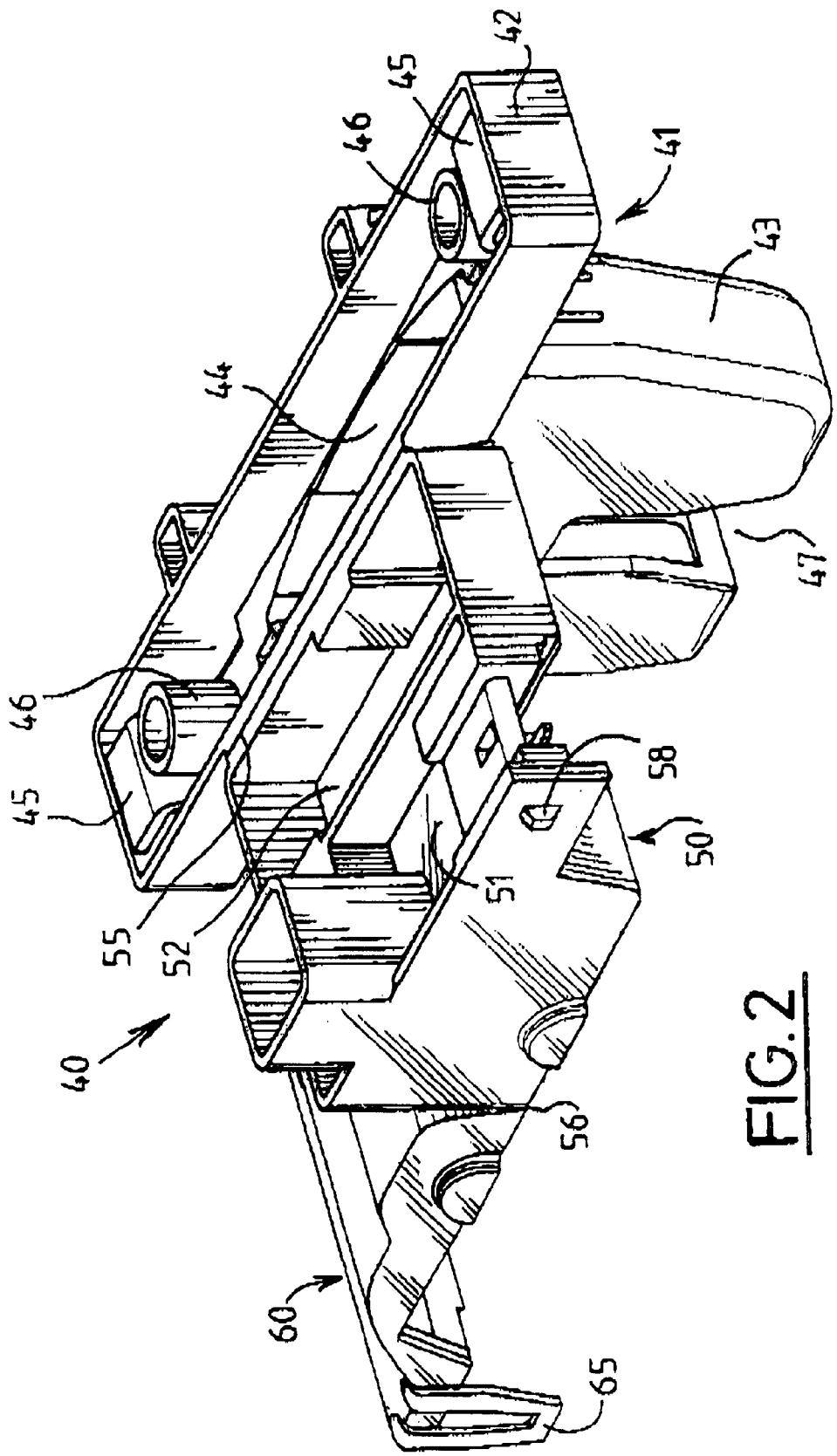
Figure 3:
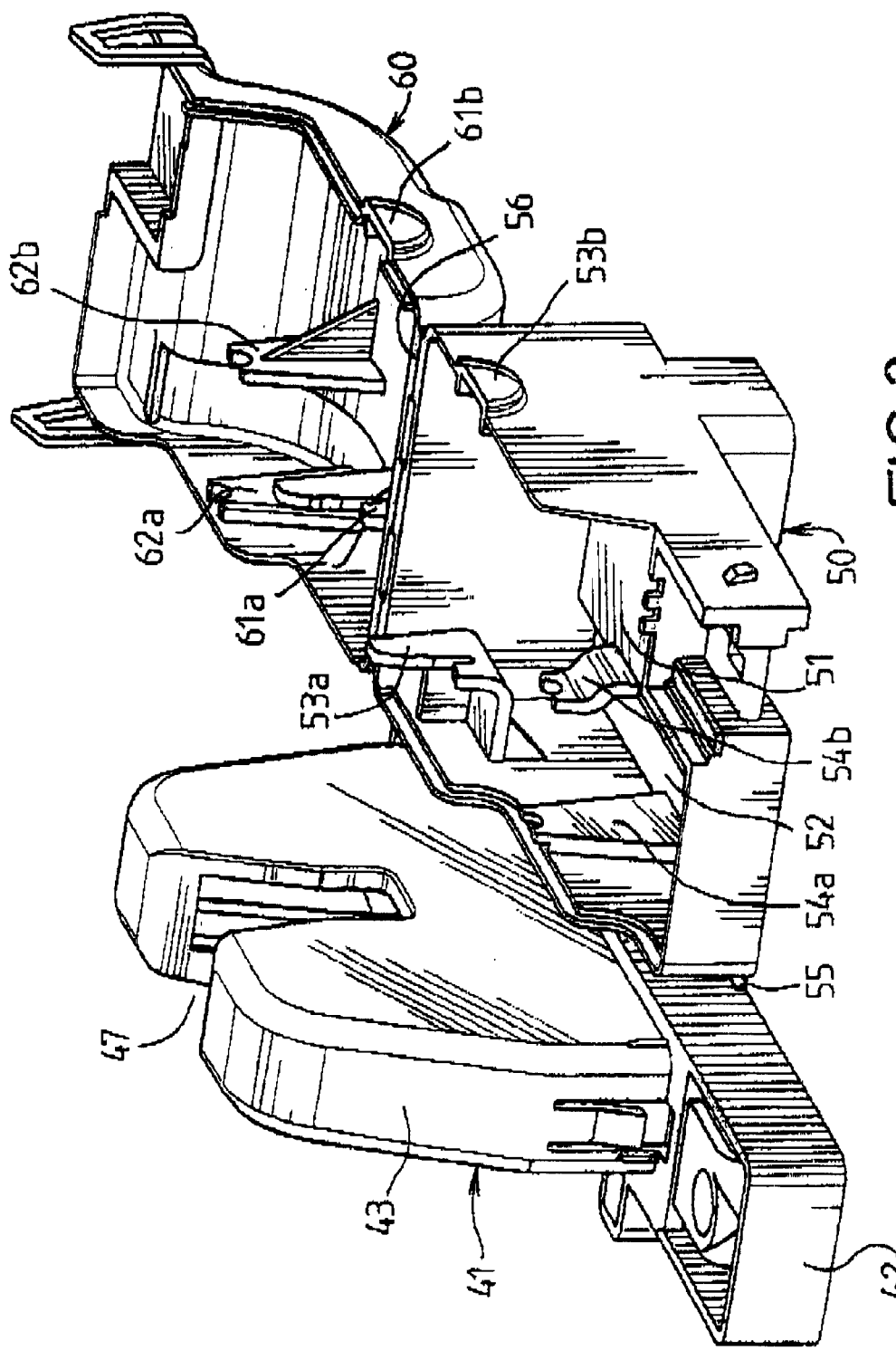
Figure 4:
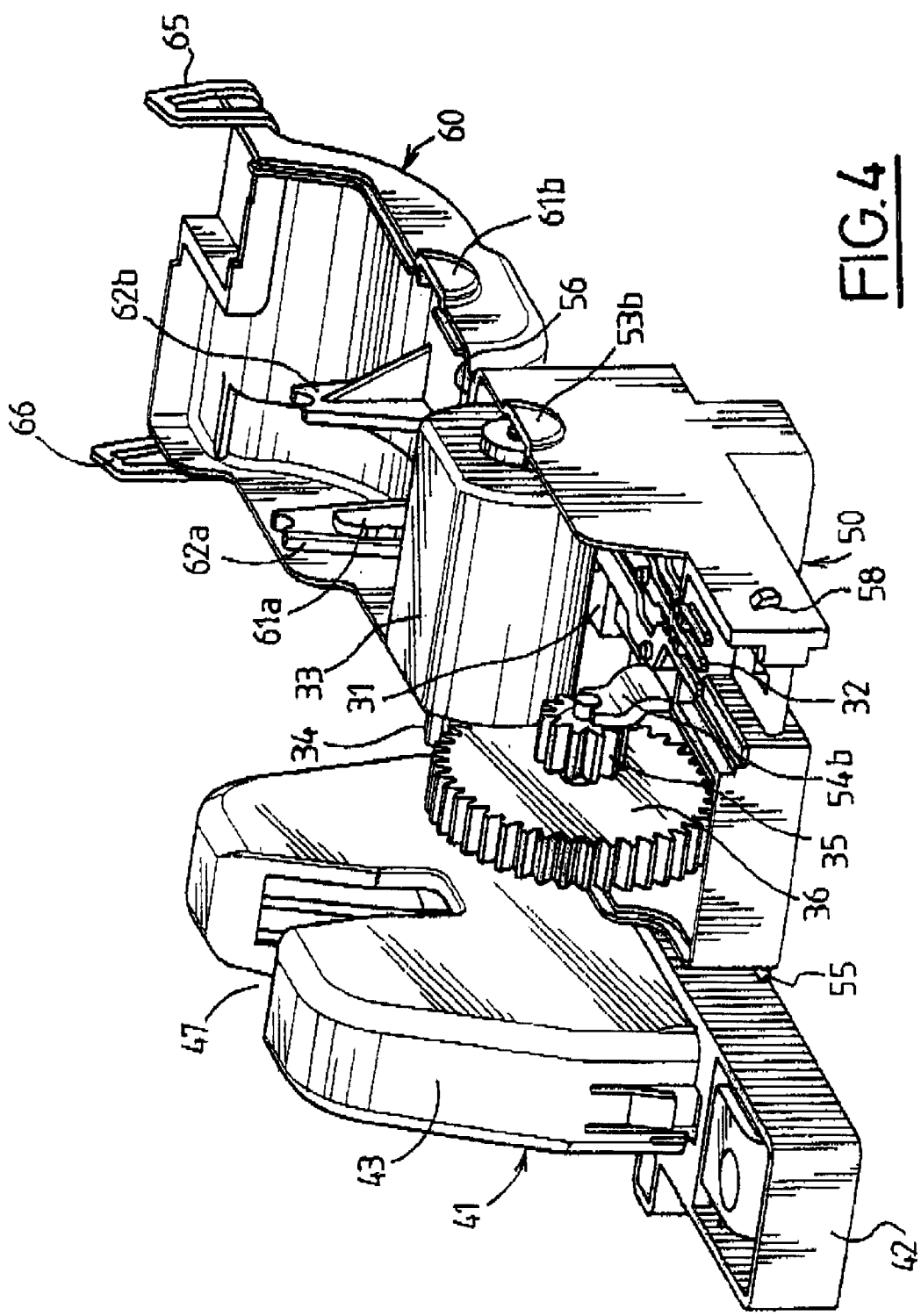
Figure 5:
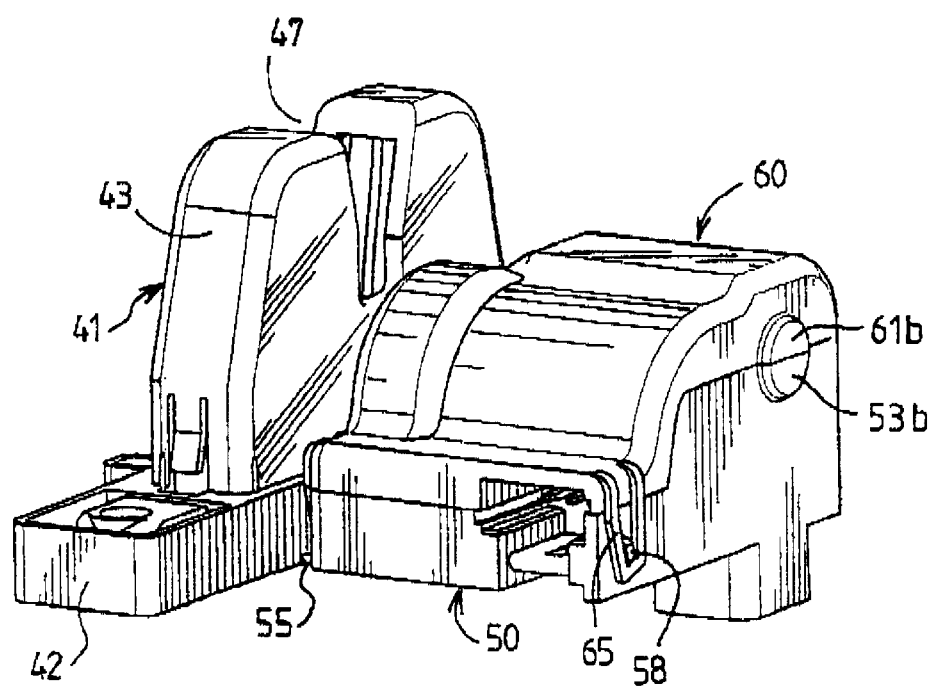
Figure 6:
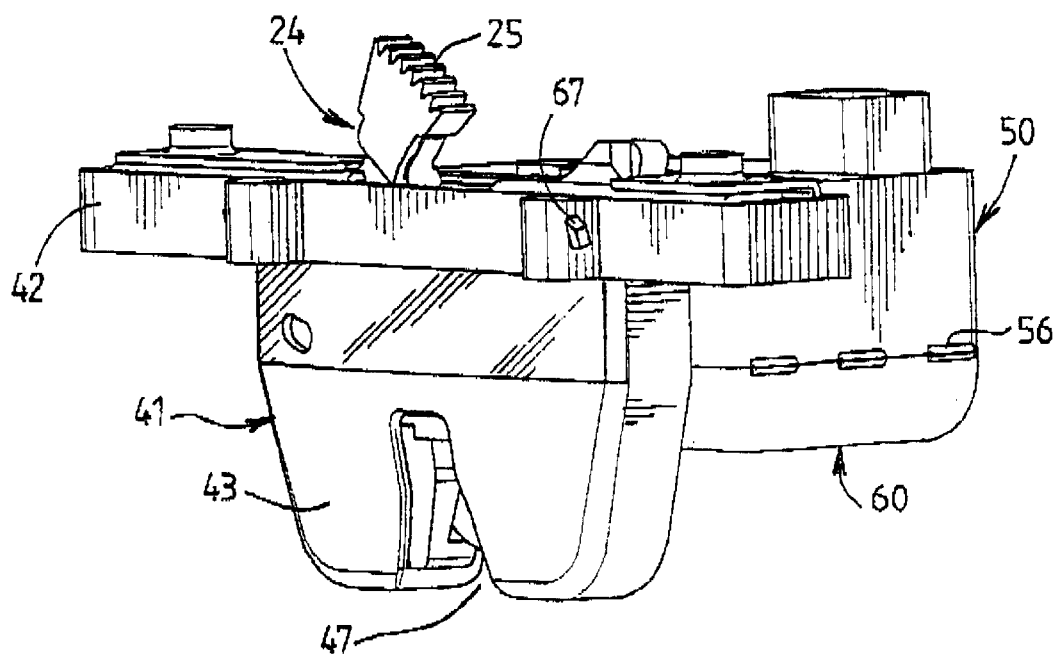
Figure 7:
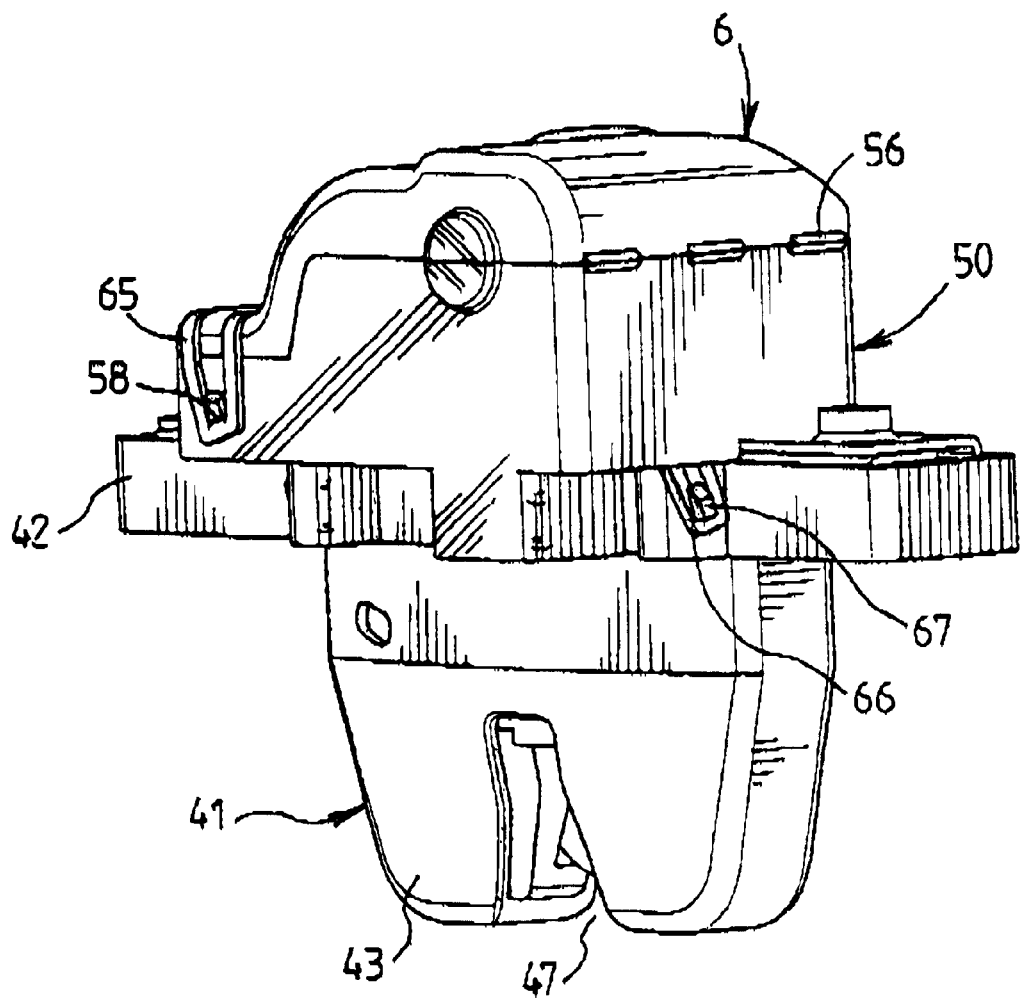

Other features and advantages of the invention will become apparent in the course of the following description, which is given with reference to the accompanying drawings, in which:

FIG. 1 is a diagrammatic exploded perspective view showing a casing according to the invention, a mechanical module and an electrical module of a lock, FIG. 2 is a top perspective view of the casing according to the invention, FIG. 3 is a bottom perspective view of the casing according to the invention, FIG. 4 is a perspective view of the casing fitted with the electrical module and a kinematic system, FIG. 5 is a perspective view of the partly closed casing, FIG. 6 is a perspective view of the casing including the mechanical module, and FIG. 7 is a perspective view of the completely closed casing.

FIG. 1 shows an electric lock for an automobile vehicle boot closure member, for example a boot lid or hatchback.

The electrical lock comprises a mechanical module 10, an electrical module 30 and a casing 40 according to the invention.

In the conventional way, the mechanical module 10 comprises two parallel brackets 11 and 12 each of which is L-shaped in cross section.

The mechanical module also comprises a bolt mounted to pivot between the two brackets 11 and 12 by means of a pivot pin 14.

The bolt 13 is therefore mounted to pivot on the pivot pin 14 between two positions, namely a position disengaged from a striker and a position engaged with said striker.

The bolt 13 has, at the bottom, a hook 15 intended to receive the striker and, on the same side as the hook 15, two notches 16 an 17 adapted to cooperate with a ratchet mechanism 20.

The bolt 13 is biased into the open position by a spring member 18 in the form of a spiral spring.

The ratchet mechanism 20 is mounted to pivot between the two brackets 11 and 12 on a pivot pin 21 and the ratchet mechanism has a generally elongate shape including a bottom arm 29 terminating in a nose 22 adapted to be housed in one of the notches 16 or 17 of the bolt 13 and a top arm 23 which passes through the brackets 11 and 12.

The ratchet mechanism 20 is associated in rotation with an actuator member 24 which has a toothed sector 25 in its upper part.

The assembly consisting of the ratchet mechanism 20 and the actuator member 24 is biased towards the bolt 13 by a spring member in the form of a spiral spring 26.

The lower part of the bracket 12 has a vertical first lug 12a and a vertical second lug 12b. These lugs are intended to receive an elastomer material stop 27. A plastics material support 28 surrounds the stop 27.

The stop 27 forms an end of travel stop to absorb impact due to engagement of the bolt and a position stop for the ratchet mechanism 20 to damp and reduce the noise when said ratchet mechanism is raised.

The support 28 also immobilises the closure member laterally relative to the structure of the boot of the automobile vehicle.

The electrical module 30 includes a sensor 31 for sensing the position of the bolt 13 and whose function is to transmit information on that position to the onboard electronics of the automobile vehicle and a connection and power supply circuit 32 for the sensor 31 and an electric motor 33.

The circuit 32 also transmits the information signal from the sensor 31.

The electric motor 33 is a DC motor, for example, and its output shaft drives a kinematic system that actuates the actuator member 24 via the toothed sector 25 and thus drives the ratchet mechanism 20.

The kinematic system is made up of a small gear 34 mounted on the output shaft of the electric motor 33 and which meshes with a large-diameter gear 36 constrained to rotate with a small diameter gear 35 which meshes with the toothed sector 25 of the actuator member 24.

The various components constituting the mechanical module 10, the electrical module 30 and the kinematic system formed by the gears 34, 35 and 36 are accommodated in the casing 40, which is described with reference to FIGS. 2 to 4.

The casing 40 is a one-piece plastics material injection moulding and includes a first member 41 receiving the mechanical module 10.

The first member 41 includes a generally rectangular and hollow upper part 42 constituting a support for the brackets 11 and 12 and an inverted U-shaped lower part 43 forming a housing 44 for the bolt 13 and the ratchet mechanism 20.

As shown in FIG. 2, the upper part 42 has two lugs 45 on the inside on which the brackets 11 and 12 bear and two bushes 46 through which pass fixing members, not shown, for securing the lock as a whole to the boot closure member of the automobile vehicle.

The lower part 43 has a throat 47 at the bottom through which the striker passes. The striker co-operates with the bolt 13 to lock the boot closure member of the automobile vehicle.

As shown in FIG. 3 in particular, the casing 40 includes a second member 50 for supporting the electrical module 30 and the gears 35 and 36 of the kinematic system.

The second member 50 is hollow and generally rectangular, its length is less than that of the upper part 42 of the first member 41, and it has a base 51 covering part of the surface of the second member 50, leaving a free space 52.

The second member 50 has on the inside bearing surfaces 53a and 53b for supporting the electric motor 33 and the small output gear 34 and bearing surfaces 54a and 54b for supporting the assembly comprising the gears 35 and 36.

The second member 50 of the casing 40 is connected to the upper part 42 of the first member 41 by a hinge 55 whereby said second member 50 pivots on said first member 41 to connect the small gear 35 of the kinematic system to the toothed sector 25 of the actuator member 24 of the ratchet mechanism 20.

The casing 40 further includes a cover 60 which has bearing surfaces 61a and 61b on its inside face complementary to the bearing surfaces 53a and 53b on the second member 50 for supporting the electric motor 33 and the small gear 34 when the cover 60 is hinged over said second member 50 and bearing surfaces 62a and 62b complementary to the bearing surfaces 54a and 54b for supporting the gears 35 and 36 when the cover 60 is hinged over said second member 50 (see below).

To enable the cover 60 to be hinged over the second member 50, the cover 60 is connected to the second member 50 by a hinge 56 on the opposite side of the second member 50 to that in contact with the first member 41 in such a manner as to support the assembly formed of the electrical module and the kinematic system by virtue of the bearing surfaces 53a, 53b co-operating the bearing surfaces 61a, 61b and the bearing surfaces 54a and 54b co-operating with the bearing surfaces 62a, 62b.

The various bearing surfaces on the second member 50, the cover 60, the brackets 45 supporting the plates and the cylinders 46 through which the fixing members pass are moulded in one piece when the casing 40 is injection moulded.

The mechanical module 10, the electrical module 30 and the gears 35 and 36 are mounted in the casing 40 in the following manner.

First of all, the sensor 31 and the circuit 32 are fixed, for example ultrasound welded, moulded or clipped, to the base 51 of the second member 50 and the connections to the sensor 31 are made via corresponding low insertion force pins.

The assembly formed of the electrical motor 33 and the small gear 34 is then placed on the bearing surfaces 53a and 53b and the assembly consisting of the gears 35 and 36 is placed on the bearing surfaces 54a and 54b, as shown in FIG. 4.

The cover 60 is hinged over the second member 50 by pivoting it about the hinge 56 so that the bearing surfaces 61a and 61b come into contact with the bearing surfaces 53a and 53b to support the electric motor 33 and the small gear 34 and the bearing surfaces 62a and 62b face the bearing surfaces 54a and 54b to support the gears 35 and 36, as shown in FIG. 5.

The casing 60 has two attachment lugs 65 on its outside face, each of which co-operates with a stud 58 on the outside face of the second member 50. The two attachment lugs 65 are disposed symmetrically facing each other. The studs 58 are similarly disposed symmetrically facing each other.

The lug 65 and the stud 58 are moulded in one piece with the casing 40.

After this first assembly operation, the mechanical module 10 is placed in the first member 41 so that the upper part of the actuator member 24 projects, as shown in FIG. 6.

The assembly formed of the second member 50 and the cover 60 fixed to said member 50 is hinged over the first member 41 by pivoting about the hinge 55 so that the gear 35 engages the toothed sector 25 of the actuator member 24 of the ratchet mechanism 20.

To lock the assembly formed of the second member 50 and the cover 60 to the first member 41, the second member 41 includes two attachment lugs 66 each of which co-operates with a stud 67 on the outside face of the upper part 42 of the first member 41, as shown in FIG. 7. The two attachment lugs 66 are disposed symmetrically facing each other. The studs 67 are similarly disposed symmetrically facing each other.

The casing 40 containing the mechanical module 10, the electrical module 30 and the kinematic system formed of the gears 34, 35 and 36 constitutes a compact assembly which can easily be mounted on a closure member of an automobile vehicle boot, for example a boot lid or hatchback.

The design of the casing according to the invention facilitates fitting and assembling the various component parts and avoids independent fixing members. This enables placement of the component parts in the casing to be automated.

The casing can be made from a plastics material, for example a plastics material reinforced with glass fibres, to provide good mechanical strength and an appropriate appearance.

What is claimed is:

1. An electrical lock casing for a closure member of an automobile vehicle boot, said lock comprising a mechanical module (10) including, on at least one bracket (11, 12), a bolt (13) pivoting between a position disengaged from a striker and a position engaged over said striker, a ratchet mechanism (20) pivoting between a position immobilising the bolt (13) in the tripped position and a position releasing said bolt (13), an actuator member (24) for actuating the ratchet mechanism (20), and an electrical module (30) including a sensor (31) for sensing the position of the bolt (13) and a connection and power supply circuit (32) for the sensor (31) and an electric motor (33) whose output shaft co-operates with a kinematic system (34, 35, 36) for actuating the actuator member (24) of the ratchet mechanism (20), characterized in that the casing comprises:

a first member (41) receiving the mechanical module (10) and including an upper part (42) for supporting said bracket (11, 12) and an inverted U-shaped lower part (43) forming a housing (44) for the bolt (13) and the ratchet mechanism (20) and having at its base a throat (47) through which the striker passes, a second member (50) for supporting the electrical module (30) and the kinematic system (34, 35, 36) joined to the upper part of the first member (41) by a hinge (55) by means of which the second member (50) pivots on the first member to connect the kinematic system (34, 35, 36) to the actuator member (24) of the ratchet mechanism (20), and a cover (60) connected to the second member by a hinge (56) whereby said cover (60) pivots over the face of the second member (50) opposite that in contact with the first member (41) to support the electrical module (30) and the kinematic system (34, 35, 36).

2. A casing according to claim 1, characterized in that the first member (41), the second member (50) and the cover (60) form a one-piece plastics material component.

3. A casing according to claim 1, characterized in that the hinge (55) between the first member (41) and the second member (50) is parallel to the plane of pivoting of the bolt (13).

4. A casing according to claim 1, characterized in that the hinge (56) between the second member (50) and the cover (60) is perpendicular to the plane of pivoting of the bolt (13).

5. A casing according to claim 1, characterized in that the second member (50) includes bearing surfaces (53a, 53b; 54a, 54b) for supporting the electrical module (30) and the kinematic system (35, 36), the cover (60) includes complementary bearing surfaces (61a, 61b; 62a, 62b) for supporting said electrical module and said kinematic system, and said bearing surfaces are moulded in one piece with said casing.

6. A casing according to claim 1, characterized in that the second member (60) has at least one lug (67) for attaching it to the first member (41), the cover (60) has at least one lug (65) for attaching it to the second member (50) and said lugs (65, 67) are moulded in one piece with said casing.

* * * * *